United States Patent [19]
Togami et al.

[11] 3,969,432
[45] July 13, 1976

[54] PREPARATION OF POLYMERIC MATERIALS DISINTEGRATABLE BY ULTRAVIOLET LIGHT

[75] Inventors: Shigenori Togami; Masaharu Okawa, both of Yokohama; Junji Hara, Kamakura; Masami Tsuruta, Odawara, all of Japan

[73] Assignee: Mitsui Toatsu Chemicals, Incorporated, Tokyo, Japan

[22] Filed: June 27, 1974

[21] Appl. No.: 483,763

Related U.S. Application Data

[63] Continuation-in-part of Ser. No. 291,294, Sept. 22, 1972, abandoned.

[30] Foreign Application Priority Data

Sept. 29, 1971 Japan................................ 46-76180
Jan. 14, 1972 Japan................................. 47-6351

[52] U.S. Cl............................ 260/880 R; 260/83.7; 526/66; 526/340
[51] Int. Cl.²......................................... C08F 236/10
[58] Field of Search............... 260/83.7, 84.1, 880 R

[56] References Cited
UNITED STATES PATENTS

| | | | |
|---|---|---|---|
| 2,835,645 | 5/1958 | D'Ianni............................... | 260/45.5 |
| 3,299,178 | 1/1967 | Short.................................. | 260/880 R |
| 3,317,492 | 5/1967 | Hochwalt............................ | 260/79.5 |
| 3,328,488 | 6/1967 | Delacretaz......................... | 260/880 R |
| 3,386,926 | 6/1968 | Gavoret.............................. | 260/83.7 |
| 3,579,612 | 5/1971 | Lowell............................... | 260/880 R |

FOREIGN PATENTS OR APPLICATIONS
606,980   8/1948   United Kingdom

*Primary Examiner*—Paul R. Michl
*Attorney, Agent, or Firm*—Fisher, Christen & Sabol

[57] ABSTRACT

A process for preparing vinyl aromatic resin-, e.g. styrene-,based resinous materials to render them brittle and disintegratable upon prolonged exposure to ultraviolet light while retaining, in the absence of ultraviolet light, substantially the same appearance, processability and mechanical properties of conventional vinyl aromatic resin-based materials, comprising copolymerizing said vinyl aromatic monomer with from 0.5 to 6.0% of a conjugated diene monomer, e.g. isoprene, based on the total weight of the two monomers, initially copolymerizing said vinyl aromatic monomer with only a portion of the total amount of conjugated diene monomer and then completing the copolymerization with the remainder thereof, and the polymeric resin obtained by said process.

9 Claims, No Drawings

PREPARATION OF POLYMERIC MATERIALS DISINTEGRATABLE BY ULTRAVIOLET LIGHT

CROSS REFERENCCE TO RELATED APPLICATION

This application is a continuation-in-part of copending application Ser. No. 291,294 filed Sept. 22, 1972, now abandoned.

BACKGROUND OF THE INVENTION

1. Field of the Invention

The present invention relates to an improved process for preparing resinous molding materials (more particularly, vinyl aromatic resin, e.g., styrene-based resinous materials) to render them brittle and disintegratable within a short period of time through the action of ultraviolet rays, e.g., sunlight, and to the resinous molding materials thus produced. Said materials are of particular advantage for use in packaging.

2. Description of the Prior Art

With the popularization of self-service sales systems and supermarkets, the demand for so-called one-way or disposable resinous materials for packaging is constantly increasing. Most preferable among the many resinous packaging materials are the polystyrenes because of their excellent properties as a packaging material, for example, good processability, good strength and good sanitary properties for use with food. in fact, they are used as packaging materials in varied ways, for example, as food packaging sheet materials, package cushioning materials,, and package partitioning materials.

These resinous packaging materials, however, are in general very stable and will not undergo substantial degradation over a long period of time, and this has now given rise to the problem of waste-disposal as discussed in more detail hereinbelow. In general, products formed from the above-described packaging materials are bulky and difficult to be rendered highly dense by compression, thus making it difficult to collect and dispose of the same after use. In addition, objects formed from such packaging resinous materials, e.g., cans, boxes, wrappers, cups, forks, spoons, etc., which might be left or thrown away at resort areas or by the sides of highways, are difficult to be decomposed under natural conditions and thus will remain dispersed and unsightly over a long period of time, which not only detracts from beautiful scenery, but also leads to undesired results from environmental and sanitation points of view. Although these wastes are in part recovered at the expense of considerable labor and cost, the amounts have tended to increase through the years.

Heretofore, in attempts to solve the above described problem, polystyrenes have been explored that, after use as packaging containers, are capable of being rendered brittle and disintegratable under the irradiation of sunlight. All such attempts, however, have been directed to achieving this purpose by adding to the polystyrenes various photosensitizers, many of which have toxicity. Accordingly, these prior art methods are accompanied by toxicity problems which are particularly limiting when the photosensitized polystyrenes are to be used as packaging materials for food where strict toxicity and sanitary requirements are in effect.

On the other hand, it has not been practiced in the past to manufacture a hard resin by copolymerizing a vinyl aromatic monomer with 10% by weight or less, with reference to said vinyl aromatic monomer, of a conjugated diene monomer, because such a hard resin has been of no practical value, or rather, nothing has been known about the practical value thereof. In our copending application Ser. No. 291,294 we have described resinous packaging materials obtained by copolymerizing a vinyl aromatic monomer with less than 10% by weight of a conjugated diene monomer based on the total weight of said monomers and several methods of conducting the copolymerization are disclosed. It has now been found, however, that optimum characteristics of high resistance to thermal discoloration (required for molding processes), excellent disintegratability due to decomposition by ultraviolet light and substantial freedom from fisheyes when molded into product can be obtained only in accordance with the present invention.

The resins in accordance with the present invention exhibit, when formed into packaging articles, substantially the same degree of physical properties as do packaging articles made from known polystyrene packaging materials with respect to appearance (including clarity), mechanical properties such as tensile strength and fabrication properties. In addition, when they are used as packaging for products and then discarded, for example on roads, as waste, they self-destruct and are rendered brittle and disintegratable by the action of ultraviolet rays or sunlight and thus it is easy to highly compact and densify the same by compression, thereby facilitating their accumulation and disposition. Moreover, when left outdoors and not recovered, they will be discolored to assume a tan or earth color and become brittle and disintegratable within a very short period of time, breaking into small pieces and into powder which then may be mixed unobtrusively into the soil.

SUMMARY OF THE INVENTION

The present invention contemplates a process for copolymerizing a vinyl aromatic monomer with a conjugated diene monomer wherein said conjugated diene monomer is used in an amount of from 0.5 to 6.0% based on the total weight of said two monomers, and the polymeric resin obtained by said copolymerization. It is essential that a portion only of said conjugated diene monomer is initially copolymerized with the total amount of the vinyl aromatic monomer, after which the copolymerization is completed with the remainder of the conjugated diene monomer. The resultant resin is a random copolymer especially useful for molding into packaging materials since it is highly resistant to thermal discoloration and substantially free from fisheyes when molded and is readily disintegrated and discolored by exposure to ultraviolet light.

DESCRIPTION OF THE PREFERRED EMBODIMENTS

In the process of the present invention, a vinyl aromatic monomer, e.g., styrene, is copolymerized with from 0.5 to 6.0%, preferably from 1.0 to 5.0%, of a conjugated diene monomer, preferably isoprene, based on the total weight of the two monomers. Initially, only a portion, e.g. from 15% to 70%, of the total quantity of conjugated diene monomer is copolymerized with the vinyl aromatic monomer, after which the copolymerization is completed with the remainder of the conjugated diene monomer.

Examples of vinyl aromatic monomers which may be used for preparing copolymers in accordance with the present invention include styrene, α-methylstyrene, p-vinyltoluene, p-chlorostyrene, β-chlorostyrene, β-nitrostyrene, 3-hydroxystyrene, 3-methoxystyrene, and the like.

Examples of the conjugated diene monomers which may be used in accordance with the present invention include butadiene, isoprene and chloroprene, although isoprene is, in particular, greatly preferred since it is rendered brittle and disintegratable at higher speeds by the action of ultraviolet rays or sunlight.

The preparation of copolymers in accordance with the present invention can be carried out, for example, by the bead polymerization method or the mass polymerization method, using, if necessary or desired, free radical polymerization initiators. The bead polymerization method is preferred. The copolymerization is carried out by first feeding all the amount of the vinyl aromatic monomer and a portion only of the required amount of conjugated diene monomer into a reaction vessel and copolymerizing them, and then adding the remainder of the conjugated diene monomer to the copolymerization reaction system during copolymerization. Advantages of this process include the facts that unwanted coloration upon further processing is negligible and that the resulting polymer easily and rapidly is rendered brittle and disintegratable by the action of ultraviolet rays or sunlight.

The initial quantity of the conjugated diene monomer copolymerized may be from about 15% to about 70% by weight, preferably from about 30% to about 70% by weight, of the total quantity used. The remaining portion may be used in a single addition or may be added continuously or intermittently to the copolymerization system.

The essential features of the process of the present invention are to limit the kinds of monomers used to a combination of the vinyl aromatic monomer and conjugated diene monomer; to limit the ratio of the monomers to 0.5 to 6.0% by weight of the conjugated diene monomer based on the total weight of said monomers; and to limit the method of supplying the conjugated diene monomer to that of initially adding a portion only of the above-stated total quantity thereof to the copolymerization reaction system and adding the remaining portion after commencement of the copolymerization reaction. The reasons for the above limitations are as follows:

1. When the copolymerization is carried out using less than 0.5% by weight of the conjugated diene monomer based on the total weight of the monomers, the hard resin thus obtained is not sufficiently decomposable and disintegratable by ultraviolet rays even with only a portion of the conjugated diene monomer initially added to the reaction system. On the other hand, if more than 6.0% by weight of the conjugated diene monomer based on the total weight of the monomers is used for the copolymerization, the hard resin which is thus obtained is not only insufficiently decomposable and perishable by ultraviolet rays but also produces many fisheyes when molded into a sheet product and also is poor in resistance to thermal discoloration required for molding processes. These disadvantages remain unchanged even when only a portion of the conjugated diene monomer is initially added to the reaction system.

2. In the case of so-called "package polymerization", wherein the entire quantity of conjugated diene monomer is placed in a reaction vessel together with the total quantity of vinyl aromatic monomer prior to copolymerization of these monomers, the hard resin product thus obtained is poor in resistance to thermal discoloration required for molding processes even when the copolymerization is carried out in the ratio of 0.5 to 6.0% by weight of the conjugated diene monomer based on the total weight of the monomers.

indistinguishable view of the foregoing, the monomers employed in the process Examples the present invention are limited to the vinyl aromatic monomer and the conjugated diene monomer. The copolymerization ratio is limited to 0.5 to 6.0% by weight of the conjugated diene monomer based on the total weight of the monomers. The method of supplying the conjugated diene monomer is limited to that described above. The significance of the present invention lies in that a hard resin which excels in both of the two contradictory properties of disintegratability by ultraviolet rays and resistance to thermal discoloration for molding processes and which further produces virtually no fisheyes when molded into a product such as a sheet is obtained in compliance with the above stated restrictions.

The copolymerization may be carried out without using catalysts. However, when the use of a catalyst is desired, a free radical polymerization catalyst is normally employed. Such a catalyst is selected from diacylperoxides such as benzoylperoxide, lauroylperoxide, etc.; peracid esters such as t-butylperbenzoate and t-butylperacetate; dialkyl peroxides such as di-t-butylperoxide and dicumylperoxide; and hydroperoxides such as t-butylhydroperoxide and cumenehydroperoxide.

The molecular weight of the copolymer produced may be adjusted by adding various mercaptans to the copolymerization reaction system. Photochemical sensitizers such as benzophenone and vinylketones are not necessary but, if desired, may be added to the reaction system for the purpose of accelerating the decomposition and disintegration of the copolymer product by ultraviolet rays.

The copolymerization is carried out at temperatures ranging from 50° to 150° and preferably from 60° to 130°C. After the initial addition of conjugated diene monomer, the copolymerization is carried out for from ½ to 6 hours after which the remainder of said monomer is added (in a single amount, continuously or intermittently) and the reaction is continued for from ½ to 6 hours. Generally, the reaction temperature will be increased within the above range after the total quantity of conjugated diene monomer has been added and for the final 1 to 5 hours in order that the copolymerization is substantially completed, the reaction will be continued.

When the resinous materials of this invention are used in practice as formed packaging products and then recovered after use, since they are rendered brittle and disintegratable in a very short period of time by the action of ultraviolet rays or sunlight, it is quite easy to densify the recovered wastes by compression and thus to accumulate and dispose of them. In addition, when they are left outdoors as wastes, they will be rendered brittle and disintegratable within a very short period of time, gradual coloration or discoloration to a tan or earth color will occur, and they will finally break down into powder having a color similar to that of the soil. The powder will then gradually mix into the soil and not be unsightly.

Within the range of the conjugated diene monomer content in the copolymer in accordance with the present invention, the length of exposure time necessary for attaining brittleness and disintegratability tends to be shortened with increasing conjugated diene monomer content. It is therefore possible to control the exposure time necessary for imparting these desired properties by varying the conjugated diene monomer content within the range defined in accordance with the invention.

It is also possible to incorporate lubricants or plasticizers such as calcium stearate or ethylene bisamide into the copolymer of the invention in the usual or known manner.

The materials of the invention present no toxicity problem and thus are in particular suitable as food packaging materials, i.e. can be used in practice as food packaging products without giving rise to any food sanitation or toxicity problems. Moreover, the resinous packaging materials according to the present invention, when formed into packaging articles, will not be discolored or rendered brittle and disintegratable when they are stocked under ordinary illuminating light or under sunlight passed through ordinary glass plates, i.e. as long as they are not directly irradiated by ultraviolet rays or sunlight. Thus, there is no fear that they might be degraded before or during their actual use.

Furthermore, the copolymer of this invention can be molded at the same molding temperatures as used for ordinary polystyrenes without undergoing any undesirable effects such as thermal discoloration.

The packaging articles molded from the copolymers of the invention may be in any desired forms. It is particularly advantageous to use the copolymer, for example, in the form of films for packaging of vegetables or fruits, or in the form of foamed sheets, bottles, blisters, tubs, trays or the like molded containers for packaging food or varied commercial goods.

This invention will be further described in more detail by the following specific examples wherein parts are parts by weight unless otherwise indicated.

EXAMPLE 1

Into a pressure resistant reaction vessel equipped with a stirrer were fed (per 100 parts by weight of the monomeric mixture to be fed later) 200 parts by weight of ion-exchanged water and 0.3 part by weight of polyvinyl alcohol (a dispersing agent) and then 95 parts by weight of styrene and 2.5 parts by weight (which corresponds to one half of the total amount) of butadiene. Thereafter, 0.1 part by weight of benzoyl peroxide and 0.1 part by weight of dicumyl peroxide (both used as catalyst) were added. The mixture was then heated up to 90°C. at which temperature the copolymerization reaction was continued for 3 hours. At the end of the reaction, the remainder, 2.5 parts by weight, of butadiene was added and the reaction continued for an additional 2 hours. The temperature was then raised to 120°C. at which temperature the reaction was carried out for 1 hour. The reaction mixture was cooled to normal ambient temperature and the resulting particulate product removed from the pressure resistant reaction vessel, washed with water, freed from water and dried to give 99 parts of a bead-like copolymer.

The copolymer was molded at a temperature of 200°C. into a sheet 0.3 mm in thickness by an inflation molding process and the sheet thus obtained was then formed, under heating to 150°C., into trays each 10 cm in width, 15 cm in length, and 1 cm in depth, by vacuum forming. The resulting trays were divided into two Groups, A and B, and the following tests were made with the respective groups.

Trays in Group A were allowed to stand in a dark room. Trays in Group B were left outdoors and exposed to the direct irradiation of sunlight. In the respective tests, the trays were examined with the passage of time and evaluated for their disintegratability and brittleness. The tensile strength (at rupture) of the above-described copolymers, measured in accordance with ASTM D-638-49T but before testing, was 530 kg/cm$^2$.

After 6 months, the trays in Group A were neither discolored nor brittle. The trays in Group B began yellowing at about 3 days and after 14 days had assumed a tan color. The trays disintegrated readily under finger pressure to a powder which was indistinguisable from the soil because of the similarity of color.

EXAMPLE 2–7

Into a pressure resistant reaction vessel equipped with a stirrer were fed, for each example, 200 parts by weight of ion-exchanged water and 0.3 part by weight of polyvinyl alcohol (dispersing agent), and then the initial quantities, as shown in Table 1, of styrene and butadiene in which 0.1 part by weight of benzoylperoxide and 0.1 part by weight of dicumylperoxide had been dissolved. Reaction was carried out by heating at 90°C. with stirring for 1 hour. Then, the additional quantities, as shown in Table 1, of butadiene were continuously added over a period of 3 hours. After this, the temperature was raised to 120°C. and each reaction was further carried out for 1 hour. The reaction vessel was cooled and each granular product was removed therefrom, washed with water, freed from water, dried and then pelletized by means of an extruder.

Each pelletized product was injection molded into a disc measuring 2 mm in thickness. Then, the hue of the discs were examined with the unaided eye for evaluation in terms of resistance to thermal discoloration. Each pelletized product was also molded by inflation molding into a sheet measuring 150 μ in thickness. The sheets were subjected to tests for evaluation in terms of fisheyes as well as decomposition and disintegratability by ultraviolet rays.

The decomposition or disintegratability of the products by ultraviolet rays was evaluated in the following manner: Rectangular test pieces measuring 3 cm in width and 6 cm in length were prepared from each of the above-described sheets. The test pieces were subjected to weathering tests using the standard model of Sunshine Weather Meter (manufactured by Toyo Rika). The results of the test are indicated by the length of time required for each test piece to become disintegratable. To measure this, each test piece was held by clamps on both ends thereof, leaving a distance of 2 cm between the clamps, and was bent. The test piece was judged to have become disintegratable when it is caused to break at a bending angle of less than 90°.

For the fisheye test, 30 cm square test pieces were prepared from the above-described sheets and the number of fisheyes in each test piece were counted with the unaided eye.

The results of the above tests are shown in the following Table 1.

fisheyes produced. The results of these tests are shown in Table 2.

Table 1

| | Example No. | | Reference Examples | | | Examples of the present invention | |
|---|---|---|---|---|---|---|---|
| | | 2 | 3 | 4 | 5 | 6 | 7 |
| Initial supply (parts by weight) | Styrene | 100 | 100 | 100 | 100 | 100 | 100 |
| | Butadiene | 0.03 | 3 | 2 | 4 | 0.5 | 0.5 |
| Added quantity (parts by weight) | Butadiene | 0.06 | 6 | 0 | 0 | 1.5 | 2.5 |
| Thermal discoloration | | None | Yellow | Light yellow | Light yellow | None | None |
| Decomposition and disintegratability by ultraviolet rays (hrs) | | More than 200 | 75 | 60 | 50 | 35 | 26 |
| Fisheyes (number) | | 8 | More than 50 | 19 | 25 | 8 | 10 |

Table 2

| | Example No. | | | Reference Examples | | | | Examples of the present invention | |
|---|---|---|---|---|---|---|---|---|---|
| | | 8 | 9 | 10 | 11 | 12 | 13 | 14 | 15 |
| Initial supply (parts by weight) | Styrene | 100 | 100 | 90 | 100 | 100 | 90 | 100 | 100 |
| | P-vinyltoluene | 0 | 0 | 10 | 0 | 0 | 10 | 0 | 0 |
| | Butadiene | 0 | 0 | 0 | 0 | 2 | 0 | 0 | 2 |
| | Isoprene | 0.05 | 4 | 6 | 3 | 1 | 3 | 1 | 0 |
| Added quantity (parts by weight) | Isoprene | 0.04 | 6 | 0 | 0 | 0 | 3 | 2 | 1 |
| Thermal discoloration | | None | Yellow | Yellow | Light yellow | Light yellow | Very light yellow | None | None |
| Decomposition and disintegrability by ultraviolet rays (hrs) | | More than 200 | 70 | 57 | 52 | 48 | 18 | 23 | 18 |
| Fisheyes (number) | | 8 | More than 50 | 32 | 20 | 17 | 8 | 7 | 5 |

EXAMPLES 8–15

Into a pressure resistant reaction vessel equipped with a stirrer were fed, for each example, 200 parts by weight of ion-exchanged water and 0.3 part by weight of polyvinyl alcohol, and then the initial quantities of styrene, p-vinyltoluene, butadiene and isoprene as shown in Table 2, with 0.1 part by weight of benzoylperoxide and 0.05 part by weight of t-butylperacetate dissolved therein, were supplied to the reaction vessel. Reaction was carried out by heating at 90°C. with stirring for 1 hour. Then 1/2 of the additional quantities of isoprene as shown in Table 2 were added and the reaction was continued for 2 hours. Then, the remaining ½ additional quantity of the isoprene was added for further reaction for 1 hour. The temperature was then raised to 110°C. and the reaction was allowed to continue for 2 more hours. The reaction vessel was cooled and each granular product was removed therefrom, washed with water, freed from water and dried. The products were then subjected to evaluation tests which were conducted in the same manner as in Examples 2–7 including tests of resistance to thermal discoloration for molding processes, decomposition and disintegratability by ultraviolet rays, and the numbers of fisheyes produced. The results of these tests are shown in Table 2.

The present invention further encompasses carrying out the copolymerization of the vinyl aromatic monomer and conjugated diene monomer in the presence of up to 15% by weight, based on the weight of the resultant vinyl aromatic monomer-conjugated diene monomer copolymer, of a conjugated diene-based rubber-like polymer such as linear polybutadiene or SBR or a saturated hydrocarbon-based rubber-like polymer such as an EPDM rubber or an EP rubber. The following examples illustrate this embodiment of the invention. It is emphasized that the resultant copolymer is still a random copolymer, the rubber-like polymer acting only as a filler to increase impact strength.

EXAMPLES 16–21

Referring to Table 3, for each example the initial quantities of styrene, butadiene and straight chain polybutadiene were fed into a pressure resistant reaction vessel equipped with a stirrer. The straight chain polybutadiene used was completely dissolved in the styrene. Following this, 0.1 part by weight of benzoylperoxide and 0.1 part by weight of dicumylperoxide were added to the reaction vessel, which was then heated to 75°C. with stirring and polymerization was carried out for 3 hours. Then, 200 parts by weight of ion-exchanged water in which 0.3 part by weight of polyvinyl alcohol was dissolved were added to the polymerization system and the viscous reaction mixture resulting from the polymerization was dispersed therein in a granular state.

The temperature was then raised to 90°C., and ½ of the additional quantity of butadiene or isoprene was added and the reaction was continued at this temperature for 2 hours. Then, the remaining quantities were added and the reaction was continued for 1 additional hour. The temperature was then raised to 120°C. and the reaction was continued for 3 more hours. After cooling, the granular product was removed from the reaction vessel, washed with water, freed from water and dried. The product was subjected to tests conducted in the same manner as in Examples 2–9 including tests of resistance to thermal discoloration in molding processes, decomposition and disintegratability by ultraviolet rays, and the number of fisheyes produced. The results of these tests are shown in the following Table 3.

Table 3

| | Example No. | Reference Examples | | | | Examples of the present invention | |
|---|---|---|---|---|---|---|---|
| | | 16 | 17 | 18 | 19 | 20 | 21 |
| Initial supply (parts by weight) | Styrene | 100 | 100 | 100 | 100 | 100 | 100 |
| | Butadiene | 0.04 | 7 | 3 | 4 | 1 | 4 |
| | Isoprene | 0 | 0 | 0 | 2 | 0 | 0 |
| | Straight chain polybutadiene | 5 | 5· | 5 | 5 | 5 | 5 |
| Added supply (parts by weight) | Butadiene | 0.05 | 3 | 0 | 0 | 2 | 0 |
| | Isoprene | 0 | 0 | 0 | 0 | 0 | 2 |
| Thermal discoloration | | Light yellow | Yellowish brown | Yellowish brown | Yellowish brown | Light yellow | Light yellow |
| Decomposition and disintegratability by ultraviolet rays (hrs) | | 180 | 63 | 55 | 45 | 30 | 24 |
| Fisheyes (number) | | 10 | More than 50 | 32 | 40 | 10 | 12 |

The copolymer obtained in accordance with the present invention may also be added to known high impact polystyrenes which contain a conjugated diene-based rubber-like polymer, or saturated hydrocarbon-based rubber-like polymer, in an amount of 10% by weight or more, e.g. from 10% to 100% by weight, with reference to the respective polymer contents. The resulting polymeric materials will not undergo discoloration by thermal degradation upon further processing, and when they are used for packaging as formed products, they will become brittle and didintegrate by the action of ultraviolet rays, which lead to their failure into powder with a tan to earth color. The powder will be then commingled with the soil and thus not be unsightly.

What is claimed is:

1. A process which comprises copolymerizing a vinyl aromatic monomer with from 0.5 to 6.0% of a conjugated diene monomer based on the total weight of said monomers, initially copolymerizing said vinyl aromatic monomer by a free radical mechanism with from 15 to 70% by weight of the total quantity of said conjugated diene monomer for from ½ to 6 hours, and then adding the remainder of said conjugated diene to the copolymerization system and continuing the reaction to complete said copolymerization.

2. The process according to claim 1 wherein the initial portion of said vinyl aromatic monomer copolymerized is from about 15% to about 70% by weight of the total quantity thereof.

3. The process according to claim 1 wherein said vinyl aromatic monomer is styrene.

4. The process according to claim 1 wherein said conjugated diene monomer is isoprene.

5. The process according to claim 1 wherein the copolymerization is carried out at a temperature of from about 50° to about 150°C.

6. The process according to claim 1 wherein said monomers are dispersed in a liquid during said copolymerization.

7. The process according to claim 1 wherein the amount of conjugated diene monomer is from 1.0 to 5.0% based on the total weight of the monomers.

8. The process according to claim 1 wherein said copolymerization is carried out in the presence of up to 15% by weight of a conjugated diene-based or saturated hydrocarbon-based rubber-like polymer.

9. The process according to claim 8 wherein said rubber-like polymer is linear polybutadiene.

* * * * *